Dec. 14, 1965    O. W. LA PLANTE    3,223,330
SPRAY BOOM LEVELER APPARATUS
Filed June 25, 1964
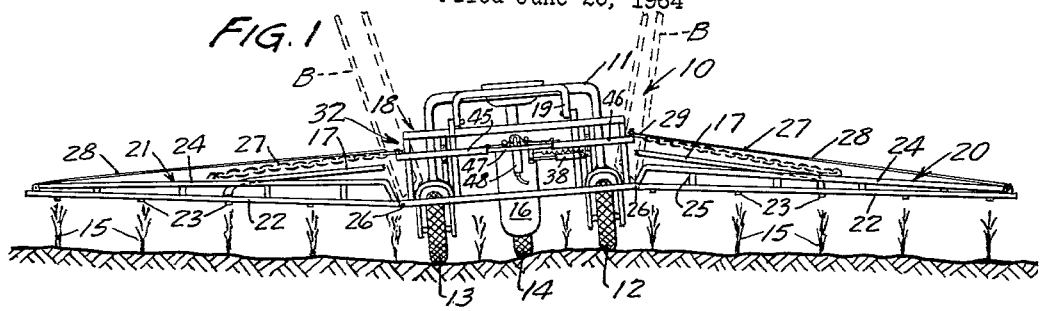
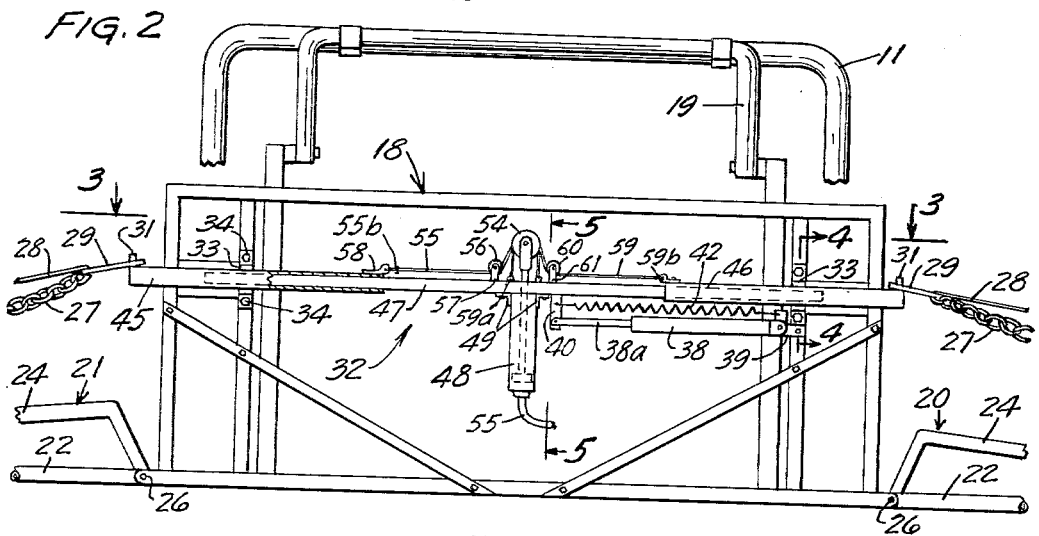
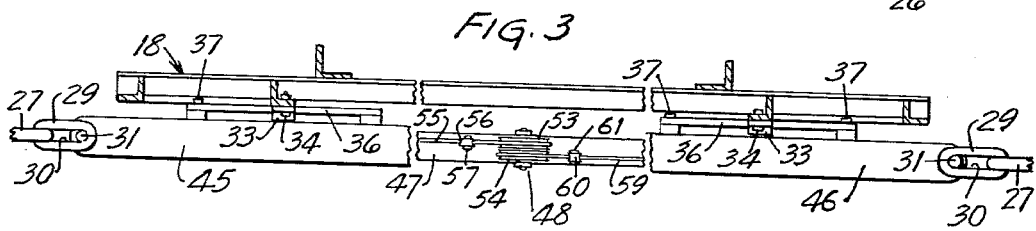
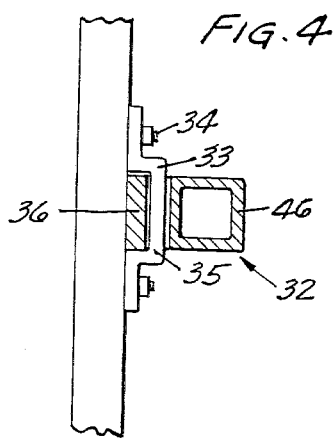
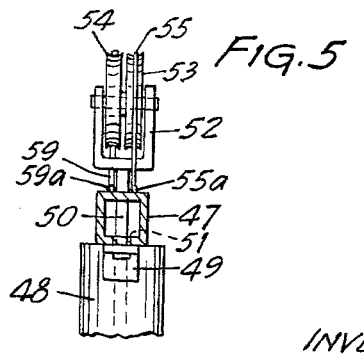
INVENTOR
OSCAR W. LaPLANTE
BY
Williamson & Palmatier
ATTORNEYS

United States Patent Office 3,223,330
Patented Dec. 14, 1965

3,223,330
SPRAY BOOM LEVELER APPARATUS
Oscar W. La Plante, Stewart, Minn.
Filed June 25, 1964, Ser. No. 377,888
7 Claims. (Cl. 239—168)

An object of my invention is to provide, in a vehicular mounted spray boom apparatus, new and improved apparatus of simple and inexpensive operation for adjusting the spray boom apparatus to and maintaining such apparatus at a predetermined relationship with the ground surface and the crops and weeds growing thereon.

Another object of my invention is to provide a novel apparatus for maintaining the outrigger vehicle mounted spray boom apparatus in substantially parallel relation with the ground so as to properly direct the spray to the crops and weeds on the ground.

A further object of my invention is to provide an improved and novel apparatus for readily and easily adjusting the spray booms in a vehicular mounted spray boom apparatus, to any of a plurality of positions including directly upright positions so that the vehicle may move along a highway.

These and other objects and advantages of my invention will more fully appear from the following description made in connection with the accompanying drawings, wherein like reference characters refer to the same or similar parts throughout the several views, and in which:

FIG. 1 is a rear elevation view of a self-propelled vehicle employing outrigger spray boom apparatus and incorporating the present invention;

FIG. 2 is an enlarged detail rear elevation view of the invention with portions of the vehicle broken away and with background apparatus eliminated for clarity of detail;

FIG. 3 is a detailed section view taken approximately at 3—3 in FIG. 1 and FIG. 2 with portions of the vehicle broken away for clarity of detail;

FIG. 4 is an enlarged section view taken approximately at 4—4 in FIG. 2; and

FIG. 5 is a detail section view taken approximately at 5—5 in FIG. 2.

One form of the invention is shown in the drawings and is described herein.

The spray apparatus is indicated in general by numeral 10 and includes a ground supporting mobile frame 11 which includes ground travel wheels 12, 13, and 14 spaced from each other so as to be adapted to travel along the ground surface between the row crop 15. The mobile frame 11 is preferably self-propelled and carries a tank 16 for the liquid to be sprayed onto the field and the vegetation including the row crops thereon. The tank 16, together with flexible hoses or conduits 17 and pumping equipment connected therebetween, provides a source of supply of pressurized liquid for spraying.

The spray apparatus 10 includes, as a part of the frame 11, a sub-frame 18 which is vertically adjustable with respect to the ground. The sub-frame 18 is generally rectangular in configuration and may be connected to the main frame 11 or any suitable means such as the connecting frame members 19.

The spray apparatus 10 also includes a pair of elongate outrigger spray booms 20 and 21 respectively extending in opposite directions outwardly in a direction transversely of the direction of travel. The spray booms include liquid conveying rigid manifold conduits or pipes 22 for discharging means such as spray nozzles 23. The liquid discharging and spraying means could merely comprise minute apertures in the manifold pipes 22, but in the form illustrated, the nozzles 23 implicitly illustrate one embodiment of the liquid spraying means. The manifold pipes 22 are connected to the supply hoses 17 from which liquid is supplied under pressure to the nozzles for spraying.

Each of the spray booms 20 and 21 also includes an elongate rigid structural supporting member 24 which may be a box channel and which extends along substantially the entire length of the pipes 22 from the rigid member 24 and in the form shown, such means include brackets or straps 25 supported on the structural member 24 and suspending the manifold pipes therebelow.

The inner ends of the spray booms 20 and 21 are swingably connected by pivots 26 to the lower portion of the sub-frame 18 so as to adapt the spray booms 20 and 21 for vertical swinging.

Means are provided for supporting the spray booms 20 and 21 to predetermined angular relation with respect to the mobile unit 11 and with respect to the ground surface and such means include connecting elements or chains 27 and cables 28 which are respectively connected to the intermediate portions and outer ends of the structural support members 24 of the spray booms. The inner ends of the chains 27 and cables 28 are connected to brackets 29 which have apertures 30 therein receiving the upstanding posts or lugs 31 rigidly affixed upon the opposite ends of an elongate extensible and retractable slide indicated in general by number 32. The slide is disposed substantially horizontally and in spaced relation above the pivots 26. It will be noted that the opposite ends of slide 32 are spaced from each other a distance substantially equal to the spacing between pivots 26 and that the opposite ends of the slide 32 are each disposed above the respective pivot by substantially equal distances, thereby establishing a substantial parallelogram relationship between the pivots 26 and the lugs 31 on the slide 32. The slide 32 is supported and guided for longitudinal and substantially horizontal movement by a pair of brackets or clips 33 affixed as by bolts 34 to spaced upright members of the sub-frame 18. The brackets 33 have generally U-shaped intermediate portions 35 receiving therethrough guide bars 36 which are maintained in spaced and parallel relation with the slide bar 32 and are affixed thereto as by bolts 37.

The extensible slide 32 includes a pair of rigid tubular end members 45 and 46 which are constructed of rectangular tubing or box channel and which mount the guide bars 36 in rigid position thereon. The tubular end members 45 and 46 telescopically receive ends of the intermediate member 47 of the slide. By sliding of the end members 45 and 46 along the intermediate member 47, the slide 32 may be lengthened or shortened.

Controllable operating means are provided for moving the slide 32 longitudinally, and in the form known, such means include a single acting hydraulic cylinder 38 with one end pivotally connected to a rigid ear 39 affixed as by welding to an upright of sub-frame 18. The ram 38a of the hydraulic cylinder is pivotally connected to a rigid ear 40 affixed as by welding to the intermediate member 47 of slide bar 32. The hydraulic cylinder 38 is connected by a hose or conduit 41 to a suitable source of hydraulic fluid under pressure and a controlling valve which is conventionally provided on the self-propelled mobile vehicle. In this form shown, a return spring 42 is oriented horizontally and has one end connected to the rigid ear 40 and has the other end thereof connected to the rigid upright frame 18.

Extension means are provided for controlling the extension and retraction of the slide bar 32, and in the form shown, such means includes a hydraulic motor or hydraulic cylinder 48 affixed as by clips 49 to the intermediate member 47 of the slide. The ram 50 of the hydraulic cylinder slidably extends upwardly through apertures 51 in the slide member 47, and terminates in a yoke 52 which mounts a pair of pulleys 53 and 54 which are individually rotatable and are disposed in side by side positions. By operation of the hydraulic motor 48, the ram 50 may be moved upwardly and downwardly under the influence of the hydraulic pressure supplied to the cylinder through a flexible conduit 55 which may be controlled in the conventional manner by suitable valve provided on the vehicle. The pulley 53 has a cable 55 trained thereover, one end 55a of which is affixed to the slide at the intermediate member 47. The cable 55 is also trained around a guide pulley 56 which is rotatably mounted on ears 57 which are affixed as by welding to the intermediate slide member 47. The other end 55b of the cable 55 is affixed as by bracket or clip 58 to the end member 45 of the slide.

Pulley 54 has another cable 59 trained thereover. One end 59a of cable 59 is affixed to the intermediate slide member 47, and the cable 59 is also trained over a pulley 60 which is journalled on mounting ears 61 which are affixed as by welding to the intermediate slide member 47. The other end 59b of cable 59 is affixed to the other end member 46 of the slide.

It will be seen that by moving the cylinder ram 50 upwardly and downwardly and thereby moving the pulleys 53 and 54 upwardly and downwardly, the cables 55 and 59 will produce a sliding motion of the end members 45 and 46 which is twice as great in magnitude as the actual linear movement of the hydraulic cylinder ram 50. The inward movement of the end members 45 and 46 produces an upward swinging of the spray booms so that the spray booms may be oriented to accommodate substantially any field contour, or may be swung entirely upwardly into the dotted line position B shown in FIG. 1 whereupon the vehicle may travel along a highway.

It will be seen that the horizontal sliding movement of the slide 32, which is produced by operation of cylinder 38 is independent of the extension and retraction of the slide 32. Initially the spray apparatus 10 is moved along the field between the crop rows with the spray booms extending outwardly therefrom and spaced slightly above the foliage of the row crops. Liquid under pressure is supplied to the manifold pipes 22 and liquid spray is directed onto the vegetation on the field for killing weeds or for fertilizing and the like. In the event that the ground contour is encountered that tends to tip the ground supported mobile frame 11 in the manner illustrated in FIG. 1, the hydraulic cylinder 38 is operated so as to produce a longitudinal sliding of the slide bar 32 and corresponding adjustment in the position of the diagonal support chains 27 and cables 28. The angular orientation of the spray booms 20 and 21 is thereby adjusted so as to extend the spray booms in substantially parallel relation with the ground contour. The spray booms will again be disposed slightly above the foliage of the row crops. When such an irregular ground contour is encountered, the spray booms will ordinarily be respectively disposed in close relation and at extremely widely spaced relation above the ground surface to render the spraying ineffective, but through the use and operation of the present invention these spray booms may be maintained in the desired relation with the row crop at all times.

Furthermore, it will be noted that in the event that the ground contour differs from that illustrated in FIG. 1, so that the ground contour has an upward grade on both sides of the vehicle, the slide may be slightly retracted by operation of cylinder 48 so as to swing both of the spray booms slightly upwardly into a slightly non-parallel position but so as to maintain the spray booms substantially parallel with the underlying contour of the field. In a similar fashion, in the event that the ground contour slopes downwardly in both transverse directions from the vehicle, the booms may be lowered slightly so as to maintain a substantially parallel relation with the field thereunder. Furthermore, by the combined operation of hydraulic motors 38 and 48, the spray booms may be adjusted to any desired intermediate orientation as to accommodate all ground contours that might be encountered in the course of spraying crops. Of course it will be understood that various changes may be made in the form, details, arrangement and proportions of the various parts without departing from the scope of my invention.

What is claimed is:

1. Field crop spray apparatus comprising:
    a mobile ground supported frame for traversing the field in non-interfering relation with crop thereon,
    a pair of elongate spray booms respectively extending in opposite directions traversely outwardly from the frame and having liquid discharging spray means to apply spray to the vegetation in the field, means pivotally connecting said spray booms to the frame to facilitate swinging of said booms upwardly and downwardly,
    means including flexible conduits connected with said spray booms and supplying liquid for spraying thereto,
    a generally horizontal slide disposed above said pivot means,
    means connecting and slidably guiding said slide to the frame for substantailly horizontal movement in a direction transversely of the frame,
    controllable operating means connected between said frame and said slide and controllably moving said slide to a desired position,
    and a pair of elongate connecting and supporting elements each connected with a respective spray boom in spaced relation with said pivot means and extending diagonally upwardly to said slide, said connecting elements being secured to said slide, whereby movement of said slide produces swinging of said spray booms in opposite directions upwardly and downwardly to facilitate maintenance of said booms in substantially parallel relation with the ground contour in the event that irregular ground contour produces tipping of said frame.

2. The spray apparatus of claim 1 and said slide having opposite ends each disposed above a respective pivot means and each spaced substantially equal distance above said pivot means whereby to maintain a substantially parallelogram relation between said pivot means and the ends of said slide whereby to produce substantially equal angular swinging of said spray booms in upward and downward directions in response to movement of said slide.

3. The spray apparatus of claim 1 wherein said controllable operating means includes a generally horizontally oriented hydraulic cylinder connected at opposite ends of the frame and slide respectively.

4. Field crop spray apparatus comprising:
    a mobile ground supported frame for traversing the field in non-interfering relation with the crop thereon,
    a pair of elongate spray booms respectively extending in opposite directions traversely outwardly from the frame and having liquid discharging spray means to apply spray to the vegetation in the field,
    means pivotally connecting said spray booms to the frame to facilitate swinging of said booms upwardly and downwardly,
    means including flexible conduits connected with said spray booms and supplying liquid thereto for spraying,
    an extensible and retractable and generally horizontal slide disposed above said pivot means, said slide having opposite ends, extension means effecting and controlling extension and retraction of said slide,
    means connecting and slidably guiding said slide to the frame for substantially horizontal movement in a direction transversely of the frame,
    controllable operating means connected between said frame and said slide and controllably moving said slide to a desired position, a pair of elongate connecting and supporting elements each connected with a respective spray boom in spaced relation with said pivot means and extending diagonally upwardly to said slide, said connecting elements being connected to the opposite ends of said slide, whereby substantially horizontal sliding movement of the slide produces swinging of said spray booms in opposite directions upwardly and downwardly to facilitate maintenance of said booms in substantially parallel relation with the ground contour in the event that irregular ground contour produces tipping of said frame, and extension and retraction of said slide together with said horizontal sliding movement facilitates proper positioning of the booms to accommodate spraying over irregularly contoured terrain.

5. The field crop spray apparatus of claim 4 wherein said adjustable and retractable slide includes a pair of end members and an intermediate member slidably connected with each of said end members being connected with a respective elongate connecting and supporting element to control the movement of a corresponding spray boom, and said controllable operating means being connected between said frame and said intermediate member of the slide.

6. The field crop spray apparatus of claim 4 wherein said adjustable and retractable slide includes a pair of end members each connected to one of said respective elongate connecting and supporting elements, said slide also including an intermediate member slidably connected with both of said end members, said extension means including a motor mounted on said intermediate member and connected with said end members, said motor effecting relative movement between said end members toward and away from each other to effect extension and retraction of said slide, and said controllable operating means also including a motor connected between said frame and the intermediate member of said slide to effect horizontal sliding of the slide.

7. The field crop spray apparatus of claim 6 wherein the motor of said extension means includes a hydraulic cylinder and cables interconnecting the hydraulic cylinder with the end members, whereby to facilitate extension and retraction of the slide and swinging of both spray booms in similar upward and downward directions without adjusting said controllable operating means and the horizontal positioning of the slide.

References Cited by the Examiner

UNITED STATES PATENTS

| 2,305,913 | 12/1942 | Troyer | 239—168 |
| 2,657,093 | 10/1953 | Kucera | 239—168 |
| 3,043,519 | 7/1962 | Tygart | 239—167 |

FOREIGN PATENTS

| 936,096 | 2/1948 | France. |
| 557,068 | 11/1943 | Great Britain. |
| 609,334 | 9/1948 | Great Britain. |

EVERETT W. KIRBY, *Primary Examiner.*